D. READ.
GRINDING MILL.
No. 29,521. Patented Aug. 7, 1860.
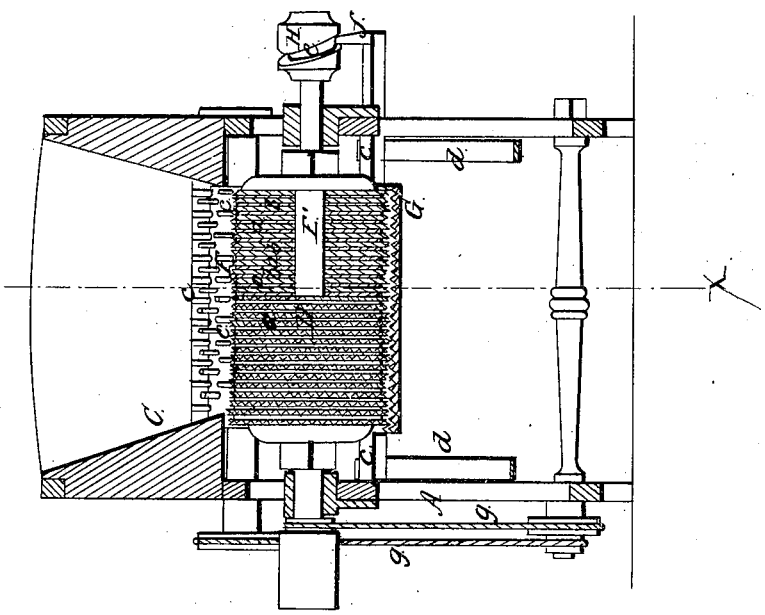
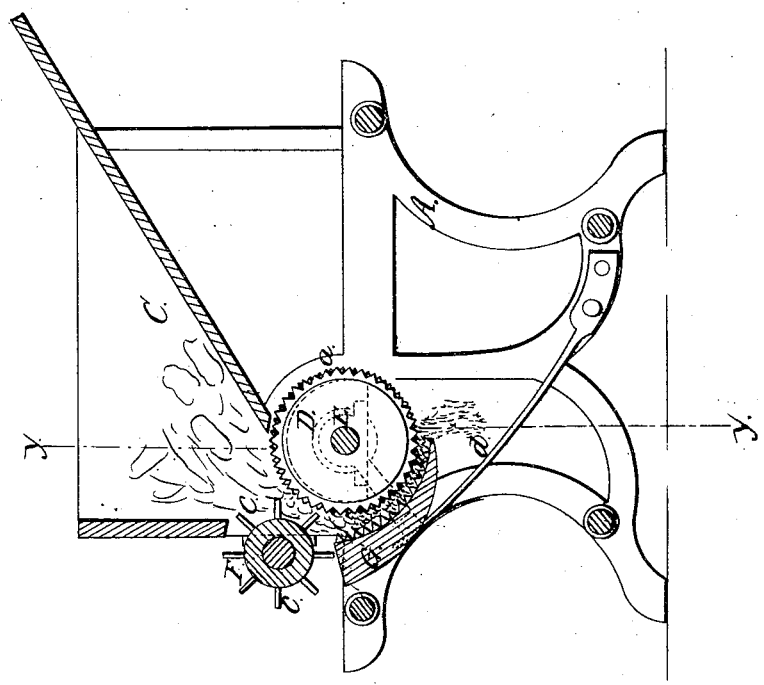
Witnesses:
W Turch
C Hughes
Inventor:
Dan'l Read
per Munn & Co
Attorneys

UNITED STATES PATENT OFFICE.

DANIEL READ, OF HAMILTON, NEW YORK.

GRINDING-MILL.

Specification of Letters Patent No. 29,521, dated August 7, 1860.

*To all whom it may concern:*

Be it known that I, DANIEL READ, of Hamilton, in the county of Madison and State of New York, have invented a new and Improved Grinding-Mill; and I do hereby declare that the following is a full, clear, and exact description of the same, reference being had to the annexed drawings, making a part of this specification, in which—

Figure 1 is a side sectional view of my invention taken in the line $x$, $x$, Fig. 2. Fig. 2 a transverse vertical section of the same taken in the line $y$, $y$, Fig. 1.

Similar letters of reference indicate corresponding parts in both figures.

The object of this invention is to obtain a machine by which substances may be ground for fodder, such as corn on the stalk, straw, hay, and various other substances which cannot be readily ground or reduced by ordinary grinding mills, the invention being also applicable for grinding bark, cane, etc.

The invention consists in the employment or use of a rotating cutting cylinder in connection with a reciprocating toothed concave and rotating feeder, arranged for joint operation as hereinafter shown and described.

To enable those skilled in the art to fully understand and construct my invention I will proceed to describe it.

A, represents a framing which may be constructed in any suitable way to support the working parts of the machine. On the upper part of this framing there is placed a hopper C, having an inclined side or bottom and on the framing below the hopper C, there is placed a cutting cylinder D. This cylinder is formed of a series of saws $a$, placed on a shaft E, and having washers $b$, between them as shown in Fig. 2. The saws $a$, are provided with teeth of the usual form.

On the framing A, and at a point rather higher than the cutting cylinder D, there is placed a cylinder F, which is provided with radial teeth $c$. The cylinder F, is equal in length to the cylinder D, and the teeth of the former work quite close to the face of the latter as shown in Fig. 1.

In the framing A, there is placed a concave G. This concave is of metal; at least, its face side is of such material and it is placed just below the toothed cylinder F, at a proper distance from the cutting cylinder D, the space between the cutting cylinder and concave gradually diminishing from its upper to its lower end as shown clearly in Fig. 2. The concave G, has a horizontal guide bar $c$, at each end and these bars $c$, are fitted in recesses in the framing and are retained in said recesses by springs $d$, or their equivalents. The bars $c$, are allowed to slide laterally in their bearings the object of which will be hereinafter stated.

On one end of the shaft E, of the cylinder D, there is placed a hub H, which has a zig-zag groove in it. Into this groove E, the end of a bar $f$, is fitted which bar projects at right angles from one of the guide bars $c$, of the concave G, see Fig. 2. The toothed cylinder F, is driven by belts $g$, $g$, from the shaft $a$, of the cutting cylinder D.

The operation is as follows. The substance to be ground is placed in the hopper C, and the cutting cylinder D, is rotated in the direction indicated by arrow 1, by any convenient power. The toothed cylinder D, is rotated by the belts $g$, in the direction indicated by arrow 2 and the concave G, is vibrated by the grooved hub H. The substance in the hopper C, is fed down between the cutting cylinder D, and concave G, by the toothed cylinder F, and the substance is cut and ground between said cylinder and concave, the vibrating motion of the concave favoring the grinding operation not only expediting the process but also causing it to be done in a thorough manner and enable stalks and other vegetable substances to be ground or reduced without choking or clogging the machine.

I am aware that rotating cutting cylinders formed of saws have been previously used, and I therefore do not claim such device separately or in itself considered; but I do claim as new and desire to secure by Letters Patent—

1. The rotating cutting cylinder D, in connection with the vibrating toothed concave G, as and for the purpose set forth.

2. The combination of the cutting cylinder D, concave G, and feeding or toothed cylinder F, arranged for joint operation as and for the purpose set forth.

DANIEL READ.

Witnesses:
J. MASON,
A. M. BAKER.